(12) United States Patent
Pack et al.

(10) Patent No.: US 9,749,697 B2
(45) Date of Patent: Aug. 29, 2017

(54) METHOD AND VIDEO DEVICE FOR ACCESSING INFORMATION

(71) Applicant: LG ELECTRONICS INC., Seoul (KR)

(72) Inventors: Bok Hyun Pack, Kyunggi-do (KR); Young Kuk Kim, Kyunggi-do (KR); Hyun Ahn, Kyunggi-do (KR); Han Seop Ryu, Kyunggi-do (KR); Yeo Han Yun, Seoul (KR); Yun Hee Han, Gyeonggi-do (KR)

(73) Assignee: LG ELECTRONICS INC., Seoul (KR)

( * ) Notice: Subject to any disclaimer, the term of this patent is extended or adjusted under 35 U.S.C. 154(b) by 37 days.

(21) Appl. No.: 14/705,369

(22) Filed: May 6, 2015

(65) Prior Publication Data
US 2015/0237405 A1 Aug. 20, 2015

Related U.S. Application Data

(63) Continuation of application No. 13/494,345, filed on Jun. 12, 2012, now Pat. No. 9,083,854, which is a
(Continued)

(30) Foreign Application Priority Data

| Apr. 12, 2000 | (KR) | .......................... 10-2000-0019335 |
| May 8, 2000 | (KR) | .......................... 10-2000-0024395 |
| Jan. 5, 2001 | (KR) | .......................... 10-2001-0000690 |

(51) Int. Cl.
*H04N 21/462* (2011.01)
*H04N 21/478* (2011.01)
(Continued)

(52) U.S. Cl.
CPC ..... *H04N 21/47815* (2013.01); *H04N 21/235* (2013.01); *H04N 21/23614* (2013.01);
(Continued)

(58) Field of Classification Search
None
See application file for complete search history.

(56) References Cited

U.S. PATENT DOCUMENTS

| 5,287,181 A | 2/1994 | Holman |
| 5,610,653 A | 3/1997 | Abecassis |

(Continued)

FOREIGN PATENT DOCUMENTS

| JP | 09-121302 | 5/1997 |
| JP | 10-174082 | 6/1998 |

(Continued)

OTHER PUBLICATIONS

Korean Office Action dated May 29, 2003.
(Continued)

*Primary Examiner* — Pankaj Kumar
*Assistant Examiner* — Charles N Hicks
(74) *Attorney, Agent, or Firm* — KED & Associates LLP

(57) ABSTRACT

A method and video device are disclosed for accessing information. In an embodiment of the present invention, part of data included in a title, being played, read from a storage medium or extracted from a broadcast signal is extracted and sent to a server over a network, and information corresponding to the part of the data (i.e., information related to the data and complete data of the data) is received from the server and played. Rather than the part of the data, information related to a position of the data, (e.g. a time point at which the playing of the data starts within the title or a radial position or a physical address at which the data is located in the storage medium) may be sent. The data may be data that
(Continued)

forms audio, a frame-shaped video clip or a frame-shaped picture included in the title.

13 Claims, 12 Drawing Sheets

Related U.S. Application Data continuation of application No. 11/819,919, filed on Jun. 29, 2007, now Pat. No. 8,205,223, which is a continuation-in-part of application No. 11/415,172, filed on May 2, 2006, now Pat. No. 7,827,557, which is a continuation of application No. 09/832,871, filed on Apr. 12, 2001, now abandoned.

(51) Int. Cl.

| | |
|---|---|
| *H04N 21/858* | (2011.01) |
| *H04N 21/8545* | (2011.01) |
| *H04N 21/81* | (2011.01) |
| *H04N 21/643* | (2011.01) |
| *H04N 21/4725* | (2011.01) |
| *H04N 21/44* | (2011.01) |
| *H04N 21/435* | (2011.01) |
| *H04N 21/434* | (2011.01) |
| *H04N 21/422* | (2011.01) |
| *H04N 21/236* | (2011.01) |
| *H04N 21/235* | (2011.01) |
| *H04N 21/472* | (2011.01) |

(52) U.S. Cl.
CPC ....... *H04N 21/4221* (2013.01); *H04N 21/435* (2013.01); *H04N 21/4345* (2013.01); *H04N 21/44012* (2013.01); *H04N 21/4622* (2013.01); *H04N 21/472* (2013.01); *H04N 21/4725* (2013.01); *H04N 21/64322* (2013.01); *H04N 21/812* (2013.01); *H04N 21/8133* (2013.01); *H04N 21/8545* (2013.01); *H04N 21/8586* (2013.01)

(56) References Cited

U.S. PATENT DOCUMENTS

| | | | |
|---|---|---|---|
| 5,774,664 A | 6/1998 | Hidary et al. | |
| 5,774,666 A | 6/1998 | Portuesi | |
| 5,778,181 A | 7/1998 | Hidary et al. | |
| 5,818,935 A | 10/1998 | Maa | |
| 5,905,865 A | 5/1999 | Palmer et al. | |
| 5,929,849 A | 7/1999 | Kikinis | |
| 6,018,768 A * | 1/2000 | Ullman | H04L 29/06 348/E7.024 |
| 6,154,771 A | 11/2000 | Rangan et al. | |
| 6,240,555 B1 | 5/2001 | Shoff et al. | |
| 6,349,410 B1 | 2/2002 | Lortz | |
| 6,467,093 B1 | 10/2002 | Inoue et al. | |
| 6,505,160 B1 | 1/2003 | Levy et al. | |
| 6,553,178 B2 | 4/2003 | Abecassis | |
| 6,615,408 B1 | 9/2003 | Kaiser et al. | |
| 7,150,029 B1 | 12/2006 | Ebling et al. | |
| 7,181,756 B1 | 2/2007 | Zigmond et al. | |
| 7,293,279 B1 | 11/2007 | Asmussen | |
| 7,395,546 B1 | 7/2008 | Asmussen | |
| 7,523,478 B2 | 4/2009 | Blackketter et al. | |
| 2002/0010941 A1 | 1/2002 | Johnson | |
| 2002/0026645 A1 | 2/2002 | Son et al. | |
| 2002/0042813 A1 | 4/2002 | Ullman et al. | |
| 2002/0044658 A1 | 4/2002 | Wasilewski et al. | |
| 2002/0059590 A1 | 5/2002 | Kitsukawa et al. | |
| 2002/0080163 A1 | 6/2002 | Morey | |
| 2003/0005463 A1 | 1/2003 | MacRae et al. | |
| 2003/0169879 A1 | 9/2003 | Akins et al. | |
| 2004/0168198 A1 | 8/2004 | Nishioka et al. | |
| 2007/0089135 A1 | 4/2007 | Qureshey et al. | |
| 2007/0169166 A1 | 7/2007 | Sako et al. | |
| 2014/0369668 A1* | 12/2014 | Onoda | H04N 5/76 386/248 |

FOREIGN PATENT DOCUMENTS

| | | |
|---|---|---|
| JP | 2000-036795 | 2/2000 |
| JP | 2004-029953 | 1/2004 |
| JP | 2004-30790 | 1/2004 |
| JP | 2005-141191 | 6/2005 |
| JP | 2005-339800 | 12/2005 |
| KR | 1999-0032116 | 5/1999 |
| KR | 10-2000-0001380 | 1/2000 |
| KR | 10-2000-0012257 | 3/2000 |
| KR | 10-2001-0086675 | 9/2001 |
| KR | 10-2006-0065544 | 6/2006 |

OTHER PUBLICATIONS

Korean Search Report dated Jun. 12, 2003.
Korean Notice of Allowance dated Nov. 2, 2007.
Office Action dated Feb. 2, 2010 in U.S. Appl. No. 11/819,919.
Office Action dated Jan. 21, 2010 in U.S. Appl. No. 11/415,172.
Final Office Action dated Jul. 6, 2010 in U.S. Appl. No. 11/819,919.
Office Action dated May 12, 2010 in U.S. Appl. No. 11/415,172.
Office Action dated Jul. 6, 2010 in U.S. Appl. No. 11/819,919.
Office Action dated Mar. 14, 2011 from U.S. Appl. No. 11/819,919.
Office Action dated Aug. 15, 2011 in U.S. Appl. No. 11/819,919.
Korean Notice of Allowance dated Jun. 19, 2013 in Application No. 10-2006-0101889 and English translation.
Office Action dated Aug. 27, 2013 in U.S. Appl. No. 13/231,234.
Office Action dated Nov. 12, 2013 in U.S. Appl. No. 13/494,345.
Office Action dated Feb. 12, 2014 in U.S. Appl. 13/231,234.
Final Office Action dated Jun. 13, 2014 in U.S. Appl. No. 13/494,345.
Office Action dated Oct. 3, 2014 in U.S. Appl. No. 13/494,345.
Notice of Allowance dated Feb. 6, 2015 in U.S. Appl. No. 13/494,345.

\* cited by examiner

| URL-included Information Table |||
|---|---|---|
| item code | item name | URL Information |
| ⋮ | ⋮ | ⋮ |
| 00010001 | racket | http://www.lgshopping.com |
| 00101001 | footwear | http://www.lgsport.com |
| 10000001 | pants | http://www.lgfashion.com |
| 10100000 | car | http://www.lgcar.com |
| 00101011 | dvd | http://www.lge.co.kr |
| ⋮ | ⋮ | ⋮ |

| URL-included Information Table | | |
|---|---|---|
| still picture index | icon image data | URL Information |
| ⋮ | ⋮ | ⋮ |
| still picture # n | icon image # k-2 | http://www.lgshopping.com |
| | icon image # k-1 | http://www.lgsport.com |
| | icon image # k | http://www.lgfashion.com |
| still picture # n+1 | icon image # k+1 | http://www.lgcar.com |
| | icon image # k+2 | http://www.lge.co.kr |
| ⋮ | ⋮ | ⋮ |

| URL-included Information Table | | |
|---|---|---|
| still pictire index | position data for (X,Y) | URL Information |
| ⋮ | ⋮ | ⋮ |
| still picture # n | $(X,Y)_{k-2}$ | http://www.lgshopping.com |
| | $(X,Y)_{k-1}$ | http://www.lgsport.com |
| | $(X,Y)_k$ | http://www.lgfashion.com |
| still picture # n+1 | $(X,Y)_{k+1}$ | http://www.lgcar.com |
| | $(X,Y)_{k+2}$ | http://www.lge.co.kr |
| ⋮ | ⋮ | ⋮ |

CP Server_Database

| | Song ID | |
|---|---|---|
| Song Entry #1 | Song Name | Audio Data |
| | Singer Name | |
| | Lyric | |
| | ⋮ | |
| Song Entry #2 | Song ID | Audio Data |
| | Song Name | |
| | Singer Name | |
| | Lyric | |
| | ⋮ | |
| ⋮ | ⋮ | ⋮ |
| Song Entry #n | Song ID | Audio Data |
| | Song Name | |
| | Singer Name | |
| | Lyric | |
| | ⋮ | |

CP Server

FIG. 19

CP Server_Database

| | Song ID | |
|---|---|---|
| Song Entry #1 | Song Name | Audio Data |
| | ⋮ | |
| | Disc ID | |
| | Position Value | |
| | Time Value | |
| Song Entry #2 | Song ID | Audio Data |
| | Song Name | |
| | ⋮ | |
| | Disc ID | |
| | Position Value | |
| | Time Value | |
| ⋮ | ⋮ | ⋮ |
| Song Entry #m | Song ID | Audio Data |
| | Song Name | |
| | ⋮ | |
| | Disc ID | |
| | Position Value | |
| | Time Value | |

METHOD AND VIDEO DEVICE FOR ACCESSING INFORMATION

The present application is a continuation application of U.S. patent application Ser. No. 13/494,345, filed Jun. 12, 2012, which is a continuation application of U.S. patent application Ser. No. 11/819,919 filed Jun. 29, 2007 (now U.S. Pat. No. 8,205,223), which is a continuation-in-part application of U.S. patent application Ser. No. 11/415,172, filed May 2, 2006 (now U.S. Pat. No. 7,827,577), which is a continuation application of U.S. patent application Ser. No. 09/832,871, filed Apr. 12, 2001, which claims priority from Korean Patent Applications 19335/2000, filed Apr. 12, 2000, 24395/2000 filed May 8, 2000, and 690/2001 filed Jan. 5, 2001, respectively, the subject matters of each of the above mentioned applications are incorporated herein by reference.

BACKGROUND

1. Field

The present invention relates generally to a method and video device for accessing information and, more particularly, to a method and video device for acquiring complete contents, part of which is included in a program received via broadcasting or a title played from a storage medium.

2. Background

According to rapid development of communication technology, a lot of individual houses have been connected to a global data network (i.e., the 'Internet') through high-speed cables, so that it is possible for most people to access easily necessary information from Internet at home. Thus, many enterprises are using the Internet as a marketing tool to deliver goods advertising information.

In addition, a television set or an optical disk player tends to adopt a data communication function and a set top box (STB), which is used to receive digital broadcast signal and provide a television set with data communication function. This means that a television set is able to bi-direction communicate. Therefore, enterprises began to use television sets as marketing tools. That is, they insert goods information into broadcast programs to be received at television sets. The goods information may be selected and used by a viewer to obtain supplementary information for buying goods through a television set.

In these marketing methods, the following method may occur. A broadcast program may include information for distinguishing goods that are displayed during program presentation, such as goods name and goods code are broadcasted. A viewer enters a specific button while watching a television set, then the television set maintains a still picture that is presented at the time when the specific button is entered, and the television set lists (or displays) goods names contained in goods distinguishing information associated with goods presented in the still picture.

When a viewer selects one among the listed goods names, the television set sends a goods code linked with the selected goods name to a predetermined web site, mainly a web site of a broadcasting station through a connected communication cable. After receiving the goods code of the selected goods, the predetermined web site sends the television set an accessing address of a site that will provide detailed shopping information including appearance and price of the selected goods.

If the television set receives the accessing address, it resends this address to the Internet through the communication cable automatically or when a viewer requests to do. Through these operations, the television set receives detailed shopping information from the addressed site and displays it to help a viewer determine whether to buy the selected goods or not through an on-line commercial transaction.

However, this method may take considerable time to acquire detailed shopping information for goods, and a viewer may not be able to watch a broadcast program during that time. Thus, a viewer may not obtain detailed shopping information even though a desirable goods is displayed on a screen, if he or she is unwilling to suspend watching a program even a short while.

A method of providing shopping information via an image screen may provide only information about tangible products displayed on a screen, and may have a limitation to the provision of accessing information or purchase information for intangible contents, such as music played in a broadcast program.

Furthermore, the method may be realized only when purchase information has been included in a broadcast program so that the users' desire to access complete intangible contents, part of which is included in a corresponding program or a title, is not satisfied in a case where a broadcast program configured to contain no additional information, such as access information or purchase information, or a title contained in a medium, such as a previously distributed CD or DVD, is played in a video device.

A problem may arise in that a user cannot listen to complete music when a DVD title, in which part of the music has been recorded as background music, is played, and the user must perform a complex process, such as Internet searching, in order to listen to the complete music.

SUMMARY

Embodiments of the present invention may provide a goods information delivering method and apparatus enabling a viewer to more quickly obtain shopping information for goods when it is displayed in a scene during watching a broadcast program.

Embodiments of the present invention may provide a goods information delivering method and apparatus enabling a viewer to obtain shopping information for a desirable goods that was displayed in program presentation without interrupting watching of a program.

Embodiments of the present invention may provide a method of acquiring information about contents or complete information, part of which is included in a program having no additional information, such as access information or purchase information.

Embodiments of the present invention may provide a method of accessing information, including extracting part of data included in a title being played and sending the part of the data to a server over a network, and receiving information corresponding to the part of the data from the server and playing the information.

In addition, embodiments of the present invention may provide a method of accessing information, including sending information related to a position of data included in a title being played to a server via a network along with ID information of the title, and receiving information corresponding to the data from the server and playing the information.

In addition, embodiments of the present invention may provide a video device, including a reading/recording unit for recording video data on a storage medium, or reading a title from a storage medium and playing the title, a communication interface for connecting to a server via a network and sending and receiving data, and a controller for controlling the reading/recording unit and the communication interface so as to send, part of data included in a title played from the storage medium, or information about a position of the data and ID information of the title, to the server, and to receive information corresponding to the data from the server and play the information.

BRIEF DESCRIPTION OF THE DRAWINGS

Embodiments may be described in detail with reference to the following drawings in which like reference numerals refer to like elements and wherein:

FIG. 19 shows a database of a server according to an example embodiment of the present invention.

DETAILED DESCRIPTION

Figure 1:
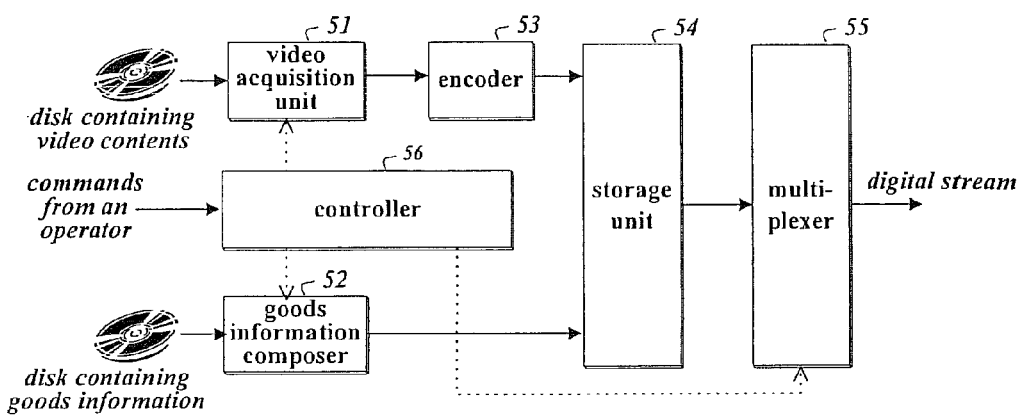
FIG. 1 is a block diagram of an apparatus for constructing and delivering goods information through broadcast programs according to an example embodiment of the present invention.

FIG. 1 is a block diagram of an apparatus for constructing and delivering goods information through broadcast programs according to an example embodiment of the present invention. Other embodiments and configurations are also within the scope of the present invention.

The apparatus of FIG. 1 includes a video acquisition unit 51 reading video contents from a data storage medium; an encoder 53 encoding the read video contents into decodable data at a receiving device; a goods information composer 52 acquiring goods information from another data storage medium; a storage unit 54 storing encoded video data and the acquired goods information; a multiplexer 55 multiplexing the stored video data and goods information according to their time codes for synchronizing goods information with video data in transmission; and a controller 56 controlling the encoder 53 to encode the video contents segment by segment according to commands of an operator and prepositioning a time code to both the encoded segment of video contents and goods information associated with the encoded contents segment.

Instead of a storage medium, the goods information composer 52 may acquire goods information by reading data entered from an operator through a key input means.

The goods information may include goods identifying information such as goods name and related-scene-describing text, icon, or player's name, and additional information such as address information of a site to access shopping information for desirable goods to be displayed in a scene.

The operation of multiplexing and transmission of video contents and goods information may be conducted in the apparatus of FIG. 1 as follows.

The video acquisition unit 51 reads or reproduces video contents from a storage medium, and applies a segment of the video contents that is specified by the controller 56 to the encoder 53. The encoder 53 encodes the applied contents segment into compressed data of a predetermined format and stores them in the storage unit 54. Then, the controller 56 selects a part of the goods information associated with the just-encoded contents segment according to an operator's command for choice of goods, and stores the selected goods information in the storage unit 54. This selected part of goods information is about goods to be presented in a scene to be viewed from the just-encoded contents.

Figure 2:
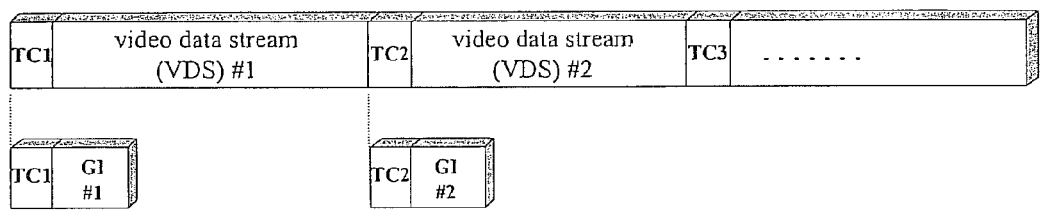
FIG. 2 shows an example in which a broadcast program and goods information are stored.

After the encoded contents and goods information are stored, the controller 56 generates a time code to synchronize the stored goods information with the associated contents segment in transmission, and prepositions it to both of the contents segment and goods information. After these operations are done, data configured as FIG. 2 may have been stored in the storage unit 54.

In the meantime, while such a encoding operation is being conducted or after the entire video contents are encoded, the multiplexer 55 transmits the encoded video contents stored in the storage unit 54 sequentially. In this transmission, the multiplexer 55 inserts and transmits goods information whose time code is identical to that of a just-transmitted video contents segment. According to this transmitting method, the data stored as FIG. 2 may be multiplexed and transmitted in sequence of 'VDS #1', 'GI #', 'VDS #2', 'GI #2' . . . . The prepositioned time code may not be transmitted.

Video contents and goods information may not be transmitted immediately after being multiplexed. Rather, the multiplexed video contents and goods information may be recorded in a portable storage medium, and may be broadcasted as being reproduced from that storage medium if a corresponding program goes on the air.

The multiplexed data from the multiplexer 55 can be broadcasted in two ways. One way is a wireless broadcast in which the multiplexed data are transmitted in the air after channel-encoded. The other way is wired broadcast in which the multiplexed data are transmitted to all connected data terminals such as PCs after format-converted appropriately.

Instead of the aforementioned goods-information transmitting method, goods information may be inserted into a service information field specified in a digital broadcast standard to be received by a digital television set.

Hereinafter explained is detailed goods-information acquisition procedure conducted in a terminal receiving an air broadcast signal including goods information inserted as aforementioned.

Figure 3:
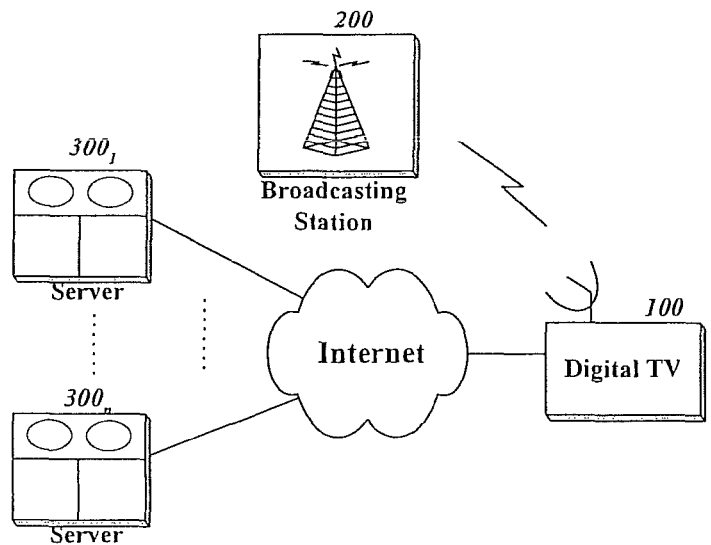
FIG. 3 shows a network in which a digital television set is connected to a global data network.

FIG. 3 shows a network in which a digital broadcast receiver, (e.g., a digital television) according to an example embodiment of the present invention is connected to a global data network (i.e., 'Internet'). Other embodiments and configurations are also within the scope of the present invention. The digital broadcast receiver 100 receives wireless broadcast signals including goods information, presents high-quality video pictures onto its cathode ray tube (CRT) after decoding the received broadcast signals. Furthermore, the digital broadcast receiver 100 can connect to various servers including goods-information providing server, on-line commercial transaction server through Internet.

Figure 4:
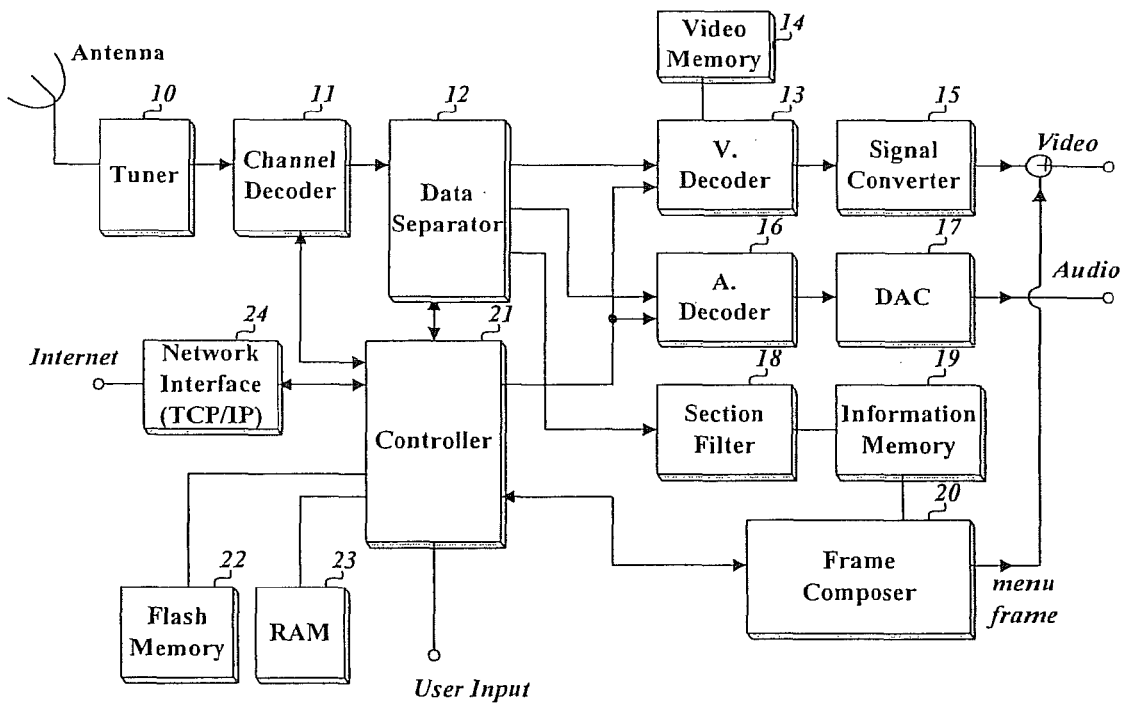
FIG. 4 is a block diagram of a digital broadcast receiver according to an example embodiment of the present invention.

FIG. 4 is a block diagram of the digital broadcast receiver 100, which may be a digital television, that includes a tuner 10 tuning a selected frequency band; a channel decoder 11 demultiplexing signals of the tuned band into individual channel data and decoding data of a chosen channel; a data separator 12 separating the decoded data into compressed video, compressed audio, and service information data including goods information; a video decoder 13 restoring the compressed video data into original data; a video memory 14 storing the decoded original video data and temporary data generated during the decoding operation; a signal converter 15 converting the decoded video data into a NTSC- or PAL-formatted video composite signal; an audio decoder 16 restoring the compressed audio data into original PCM data; a D/A converter 17 converting the restored PCM data into an analog sound; a section filter 18 separating the service information data according to its attribute into program specific information (PSI), electronic program guide (EPG), URL (Universal Resource Locator)-included information for various goods that will be presented in scenes; an information memory 19 storing the separated PSI, EPG, and URL-included information; a frame composer 20 constructing a video frame for item selection from the stored service information; a network interface 24 executing internal TCP/IP program and web browsing program to send and receive data to/from the Internet; a controller 21 controlling the above elements to execute a viewer's request; and a flash memory 22 and a RAM 23 storing control data that is required for control operation of the controller 21.

In the digital broadcast receiver 100 configured as FIG. 4, the tuner 10 tunes a frequency band carrying a signal of a chosen channel and applies the tuned signal to the channel decoder 11. The channel decoder 11 demodulates the tuned signal into a 4~8-channel-multiplexed digital data stream, conducts channel-decoding for only a data stream belonging to a chosen channel according to a channel selection control signal applied from the controller 21, and outputs the channel-decoded data stream to the data separator 12.

Figure 5:
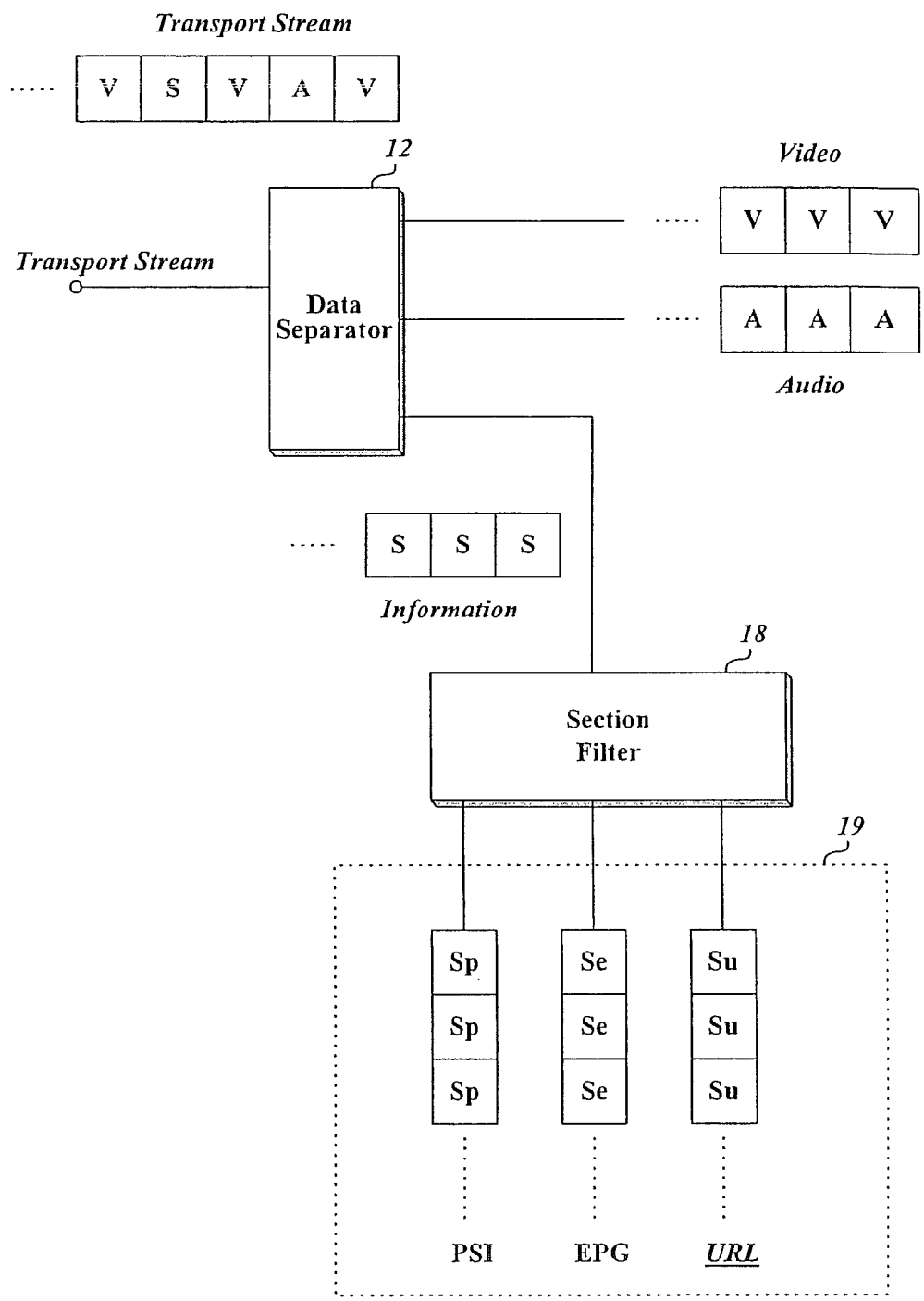
FIG. 5 shows the data separator and the section filter of the receiver of FIG. 4.

The channel-decoded data stream from the channel decoder 11 may have a data format as shown in FIG. 5 in which video, audio, and service information data including goods information are interleaved with each other. Therefore, the data separator 12 checks the header of a stream unit to know the attribute of the stream unit, and then separates the channel-decoded data stream, which consists of stream units, into three categories according to the attribute indicated by each header of a stream unit.

The video decoder 13 decodes compressed video data outputted from the data separator 12 into original video data, and the signal converter 15 converts the original video data into a NTSC- or PAL-formatted video composite signal that is adequate to present onto a displaying apparatus.

At this time, the video decoder 13 stores every decoded video frame into the video memory 14 if the decoded frame is corresponding to a intra-coded picture. If an additional video frame of a still picture is contained in the video data stream, the video decoder 13 stores the still picture frame into the video memory 14 without outputting it to the signal converter 15.

In the meantime, the audio decoder 16 decodes compressed audio data from the data separator 12 into original PCM audio data that are converted into sound signals by the D/A converter 17.

The service information data includes transport packets like video and audio data. A transport packet includes a header and a payload field, and the header of a transport packet carrying service information has a type indicator. Therefore, the section filter 18 can know which one of PSI, EPG, and URL-included goods information the payload field data of a transport packet classified into service information data belong to, based on the type indicator of a header. Through this type identification, the section filter 18 stores the PSI, EPG, and URL-included goods information separately in the information memory 19.

Transport packets carrying the URL-included goods information contains basic information on goods to be presented in certain scenes in payload fields. This basic information may consist of goods code and URL information of a web site providing shopping information such as price and appearance, and so on. This basic information may include additional information such as goods name, besides goods code and URL information.

Instead of goods name, the additional information may include an icon image related with an URL-information provided goods and entry information of intra-coded or still picture in which an URL-information provided goods is present, or may include entry information of intra-coded or still picture and position information about coordinates at which an URL-information provided goods is present as marked or highlighted in the intra-coded or still picture.

Therefore, the information memory 19 stores URL information, goods codes, and various goods-related information, besides PSI and EPG.

Hereinafter several methods will be explained to access a web site providing detailed information on a certain goods presented in a scene displayed on a screen of a digital television through using URL information, goods code, and additional information stored as above, with reference to the accompanying drawings.

Figures 6, 7:
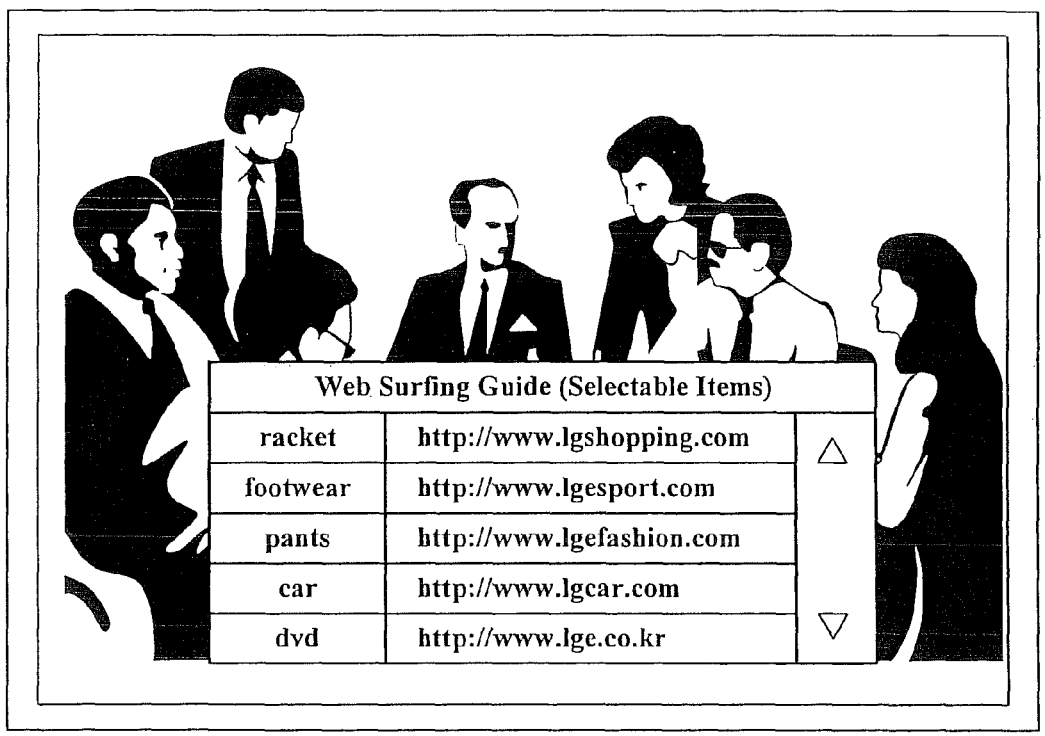
FIG. 6 shows an example of address information and goods information received and stored according to an example embodiment of the present invention.
FIG. 7 is an example of a selection video frame constructed from the data example of FIG. 6.

FIG. 6 shows an example of URL information, goods codes, and additional information including goods names, all of them being stored in the information memory 19.

A goods code may be used for preventing URL information, etc. related with same goods from being stored more than once. This preventing method is as follows.

If a transport packet outputted from the data separator 12 is corresponding to URL-included information, the section filter 18 checks goods code the data contained in the payload field of the transport packet is indicative of examines whether there is a same goods code in all the previous goods codes stored before, and stores the data contained in the payload field only if the new goods code is different from every code stored in the information memory 19. Through this operation, goods code, URL information, and goods name are stored only once for the same goods even though a goods item may be displayed repeatedly over several scenes.

A viewer watching the digital television 100 enters a specific button, for example a 'web-surfing' button while or after watching a broadcast program. Then, the controller 21 controls the video decoder 13 to stop the decoding data stream of the broadcast program, reads goods codes, goods names, and URL information stored in the information memory 19 until then, and sends them to the frame composer 20. The frame composer 20 constructs a video frame for a viewer's selection of a desirable goods item and displays it in a full or partial screen.

FIG. 7 is an example of a video frame displayed onto a screen. In this example, goods names and their related URL information are listed so that a desirable item is selected by a viewer through an 'up' button and a 'down' button. The URL information may not be listed so that more selectable goods names are displayed onto a screen.

In the condition that a selection video frame has been displayed, a viewer chooses one item through entering a 'selection' button on a remote controller or a front panel. Then, the controller 21 reads URL information associated with a selected goods name, and activates TCP/IP program of the network interface 24 to enable data communication with the Internet. After activation, the controller 21 transmits the read URL information through the network interface 24, then one or more web pages including detailed shopping information on the selected goods are received from a web site addressed by the sent URL information.

The received web pages are interpreted by a web browsing program being executed in the network interface 24 and their interpreted contents are sent to the frame composer 20 that displays the interpreted contents including price, appearance, etc. on the selected goods onto full or partial screen.

Through the above-explained operation, a viewer can acquire more quickly detailed shopping information related with desirable goods, which is or was present in a scene displayed onto a screen, from a server on the Internet during or after watching a TV.

Figures 8, 9:
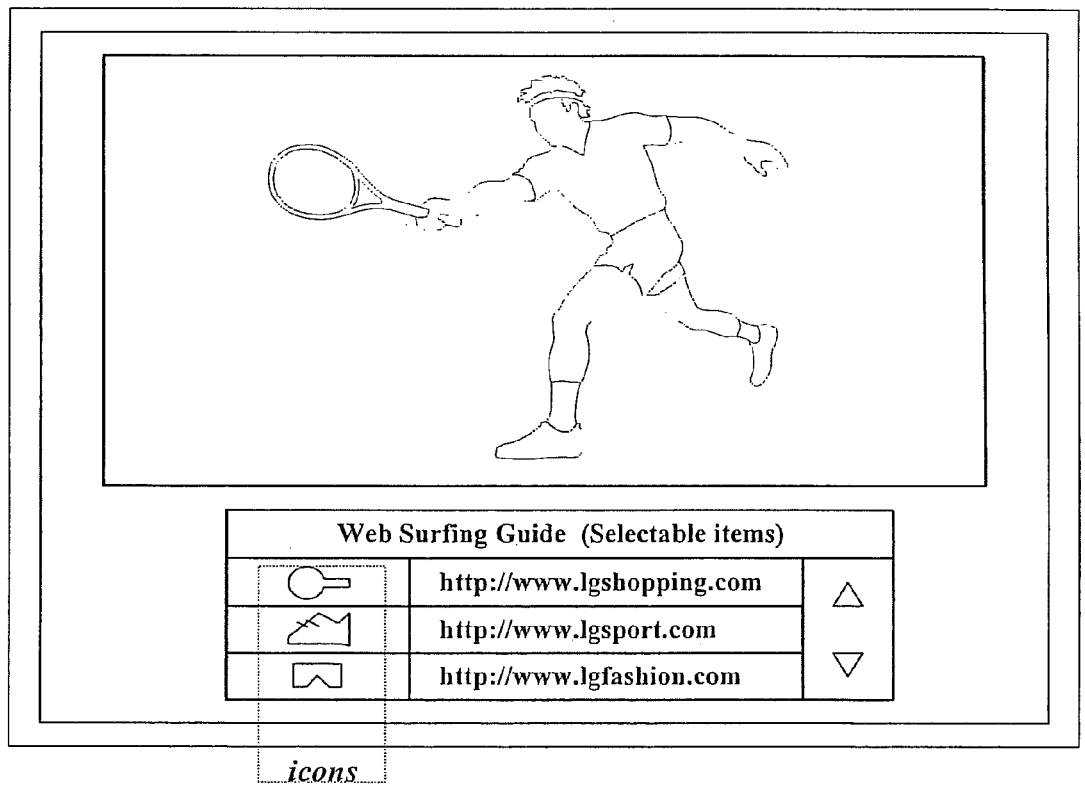
FIG. 8 shows another example of address information and goods information received and stored according to an example embodiment of the present invention.
FIG. 9 is another example of a selection video frame constructed from the data example of FIG. 8.

FIG. 8 shows another example of URL information and additional information including icon images for goods and entry information of intra-coded or still picture. The icon image is to make goods be more distinguishable than in a intra-coded or a still picture, and may be replaced with a goods name. A shopping information acquisition method using the goods information stored as shown in FIG. 8 is explained hereinafter.

A viewer watching the digital television 100 may enter a specific button, for example a 'web-surfing' button while or after watching a broadcast program. Then, the controller 21 stops current program decoding and controls the frame composer 20 to display goods information of FIG. 8 stored prior to a surfing request onto a screen. In addition, the controller 21 controls the signal converter 19 to output latest received intra-coded or still picture stored in the video memory 14 onto a screen, reads icon images and URL information having same entry information or index number that points to the displayed picture, and sends all the read data to the frame composer 20. The frame composer 20 constructs a selection window including all or a part of goods information in a screen with the displayed picture backgrounded. FIG. 9 is an example of a such-constructed video frame displayed on a screen. The URL information of FIG. 9 may not be presented on a menu screen. A viewer can select one item among the displayed goods items using an 'up' button and a 'down' button, for example.

If a viewer selects an icon image related with a desirable goods on the displayed still picture, the controller 21 reads URL information linked with a selected icon image, and receives and delivers detailed information of a selected good contained in a web page to a viewer through conducting the above-explained communication operation using the read URL information.

If there is not a goods item in the presently displayed still picture, a viewer may request another picture, that is, previous picture goods items are linked with. Then, the controller 21 examines the goods information stored as shown in FIG. 8 to find out entry information indicative of intra-coded or still picture preceding the presently displayed picture, and outputs the picture pointed by the found entry information and URL information of goods linked with the outputted picture.

If there is a scroll request through '▲' and '▼' buttons and the current selection bar is on the boundary of a list window, the controller 21 reads the previous or next picture and goods information linked to that picture and displays them.

Figures 10, 11:
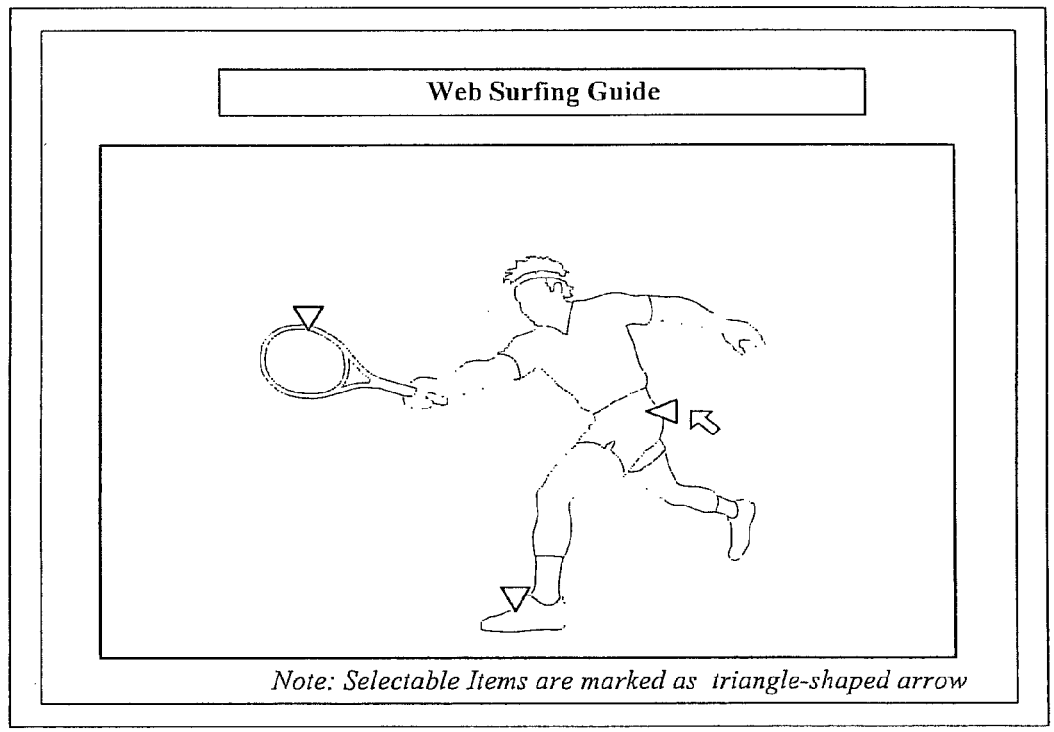
FIG. 10 shows another example of address information and goods information received and stored according to an example embodiment of the present invention.
FIG. 11 is another example of a selection video frame constructed from the data example of FIG. 10.

FIG. 10 shows another example of URL information and additional information including coordinate values at which goods items are on a screen and entry information of an intra-coded or still picture. The embodiment of FIG. 10 is different from that of FIG. 8 in that the additional information consists of coordinate values rather than icon images.

To enhance viewer's convenience in this embodiment of FIG. 10, a broadcasting station may provide an additional still picture in which an area around a goods item goods information is linked with is highlighted or marked. FIG. 11 is an example of a still picture constructed according to this method. In this picture example, an area around a goods item is arrow-marked.

In the embodiment for the goods information of FIG. 10, a still picture is displayed together with one or several marks if a viewer requests goods selection menu as described in the embodiment for the goods information of FIG. 8, and an arrow-shaped pointer is generated and displayed on the still picture so that a viewer selects a desirable goods.

If a viewer selects a highlighted or marked goods item in the middle of tracking of the pointer movement on the displayed picture, the controller 21 detects position value of the pointer the moment the selection is done, compares the detected position value with the stored coordinate values of FIG. 10. If there is a stored coordinate value whose distance from the detected position is shorter than a threshold value, the controller 21 reads URL information linked with that stored coordinate value, and receives and displays detailed information of a selected goods written in a web page to a viewer through conducting the above-explained communication operation using the read URL information.

Hereinafter explained is a detailed goods-information acquisition procedure conducted in a terminal receiving a wired broadcast signal including goods information provided through the Internet.

Figure 12:
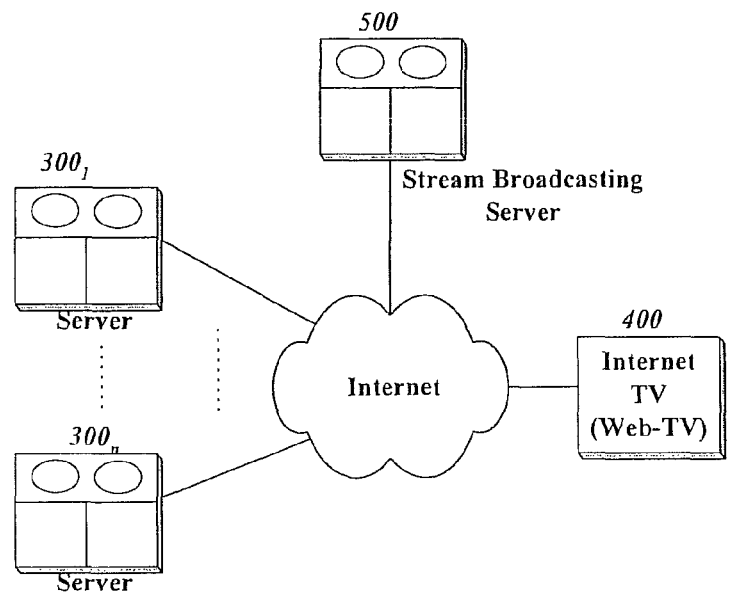
FIG. 12 shows a network in which a web TV is connected to a global data network.

FIG. 12 shows a network in which a network terminal (e.g., a web TV) is connected to the Internet according to an example embodiment of the present invention. Other embodiments and configurations are also within the scope of the present invention. The web TV 400 receives a wired broadcast data stream including goods information from a broadcasting server 500, presents video pictures onto its CRT after decoding the received broadcast data stream. Furthermore, the web TV 400 can connect to various servers ($300_1$, ... $300_n$) including a goods-information providing server, and an on-line commercial transaction server through the Internet.

Figure 13:
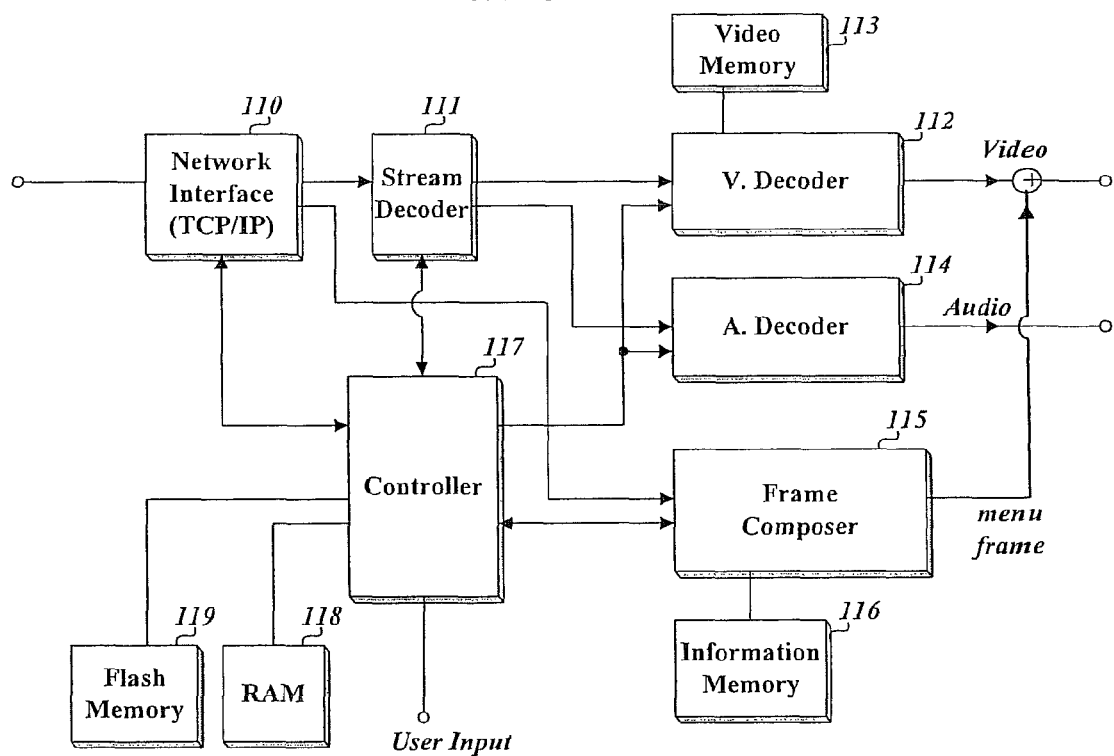
FIG. 13 is a block diagram of a web TV according to an example embodiment of the present invention.

FIG. 13 is a block diagram of the web TV 400 that includes a network interface 110 receiving data streams broadcasted in a multi-casting or uni-casting way, and extracting program streams, goods information related with goods to be presented in scenes, and accessing address information from the received data streams; a stream decoder 111 decoding the program streams into compressed video and audio streams; a video decoder 112 restoring the compressed video stream into original video data; a video memory 113 storing the decoded original video data and temporary data generated during the decoding operation; an audio decoder 114 restoring the compressed audio stream into original audio data; an information memory 116 storing the goods information and its related accessing address information; a frame composer 115 constructing an item selection video frame, which is for a viewer's selecting a goods item, from the stored information; a controller 117 controlling the above elements to execute a viewer's request; and a flash memory 119 and a RAM 118 storing a web browsing program and control data that is required for control operations of the controller 117.

If a data stream broadcasted through Internet is in a format processible by the media player of Windows, the stream decoder 111, the video decoder 112, and the audio decoder 114 may be replaced with a program executed by a central processing unit (CPU). Hereinafter explained are several methods to access a web site providing detailed information on a certain goods present in a scene displayed on a screen of the web TV 400, with reference to the accompanying drawings.

In the web TV 100 of FIG. 13, the network interface 110 receives data streams through the Internet and extracts program streams and goods information streams according to the pre-specified protocol. The extracted program streams include moving picture data streams sent to the stream decoder 111 and the extracted goods information streams sent to the frame composer 115.

Figure 14:
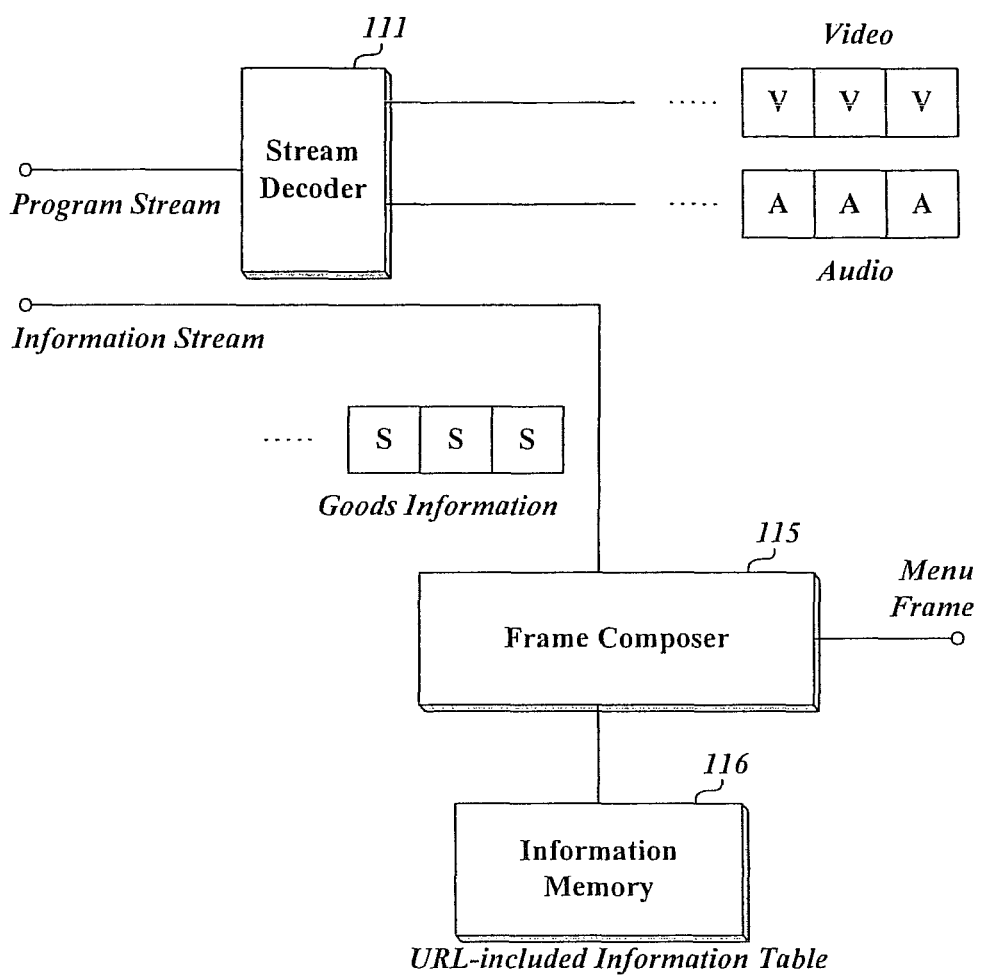
FIG. 14 shows the stream decoder and the frame composer of the web TV of FIG. 13.

The stream decoder 111 decodes the program streams into compressed video and audio data according to an attribute of the data stream as shown in FIG. 14. The compressed video and audio data are restored into original video and sound data, respectively, by the video decoder 112 and the audio decoder 114. The video decoder 112 stores intra-coded video frame among the decoded video data in the video memory 113 under the control of the controller 117 and sends the entry information for indexing the stored intra-coded video frame to the frame composer 115 that links the received entry information with the goods information received at the time when the entry information is received.

If the data streams broadcasted from the broadcasting server 500 have additional still picture data only for selecting a goods item, the video decoder 112 stores the still picture data in the video memory 113 without outputting for presentation, and provides the frame composer 115 with entry information for indexing the stored still picture data.

The frame composer 115 extracts goods information from the goods information streams and stores them in the information memory 116. When goods information needs to be displayed, the frame composer 115 reads a part of the stored goods information and converts it to be displayed onto a screen of the web TV 400 so that a viewer can select a goods item.

In case that goods information is delivered through a wired broadcast digital data stream, there may not be linking information between video pictures and goods information. If then, the web TV 400 considers a intra-coded or still picture, which is received at the closest time when goods information is received, to be associated with that goods information, and generates linking information between that intra-coded or still picture and that goods information. The generated linking information is then stored in the information memory 116 together with corresponding goods information. This linking information generating/storing operations are conducted by the frame composer 115 under control of the controller 117.

The reason why this linking information is generated and stored is to display a scene, which has been or is being viewed, probably including a goods item for which goods information is provided, when a viewer requests a selection menu for goods items. However, if goods items are to be listed with a background page having no relation with the listed goods as shown in FIG. 7, the operations related with the linking information are not necessary.

In the case of a wired broadcast through the Internet, a goods code is also included in goods information like the air broadcast so that the same goods information is never stored in the information memory 116 more than once.

The web TV 400 of FIG. 13 can show received goods information to a viewer in various ways like the above mentioned digital television 100. For example, in case that goods name, goods code, and URL information are provided, this information may be stored in the information memory 116 as shown in FIG. 6, and a selection menu like FIG. 7 is displayed by the frame composer 115 when a viewer requests. In case that an icon image and URL information are provided, this information may be stored as shown in FIG. 8 and may be presented as in FIG. 9. And if a coordinate value for a goods item and URL information are provided, this information may be stored as shown in FIG. 10 and a selection frame may be constructed as in FIG. 11.

If a viewer selects one item in the selection frame, the controller 117 searches for URL information related with the selected item, and sends it to the network interface 110. The network interface 110 transmits the received URL information to the Internet according to the specified protocol. At this time, the web browsing program stored in the flash memory 119 is executed by the controller 117. After that, a server addressed by the sent URL information transmits a web page data, and the network interface 110 receives the web page data and sends them to the activated web browsing program. The web browsing program interprets the web page data, and sends text and video data to the video decoder 112 and audio data to the audio decoder 114. Then the video and audio decoder 112 and 114 decode the respective received data into video and sound signal to be presented to a viewer. Through this presentation, a viewer can view detailed information on selected goods contained in the displayed web page.

In the above-explained embodiments, URL information for a site to acquire detailed information on goods is provided along with information about goods items. However, URL information can be provided through different procedure only if a viewer requests it.

The following embodiment conducted by the digital television 100 of FIG. 4 is for this case.

The digital television 100 stores goods information not including URL information in the information memory 19 so that a viewer may shop desirable goods through the Internet after watching a program is done. At this time, goods codes may be checked to prevent same goods information from being stored more than once. That is, the section filter 18 may compare a current received goods code with previous ones stored in the information memory 19, and store the received goods code along with associated goods information in the information memory 19 only if there is no same stored code with the received one.

Various goods identifying information may be used rather than the goods code. A goods name may also be used as goods identifying information to prevent repetitive store. However, different goods that were presented in different scenes may not be distinguished due to their same name. Therefore, goods name description information may be appended such as name of a place where a goods item is and name of a player who wears a goods item, for example, 'computer (at Joe's room)', 'pants (Smith)', 'pants (Tom)', etc.

In the condition that goods information not including URL information has been stored in the information memory 19, a viewer watching a TV enters a 'web-surfing' button while or after watching a broadcast program. Then, the controller 21 stops current program decoding and controls the frame composer 20 to display goods information stored until a surfing request onto a screen of the digital television 100.

If a viewer selects one goods item among several items that were present in a scene displayed on a screen, the controller 21 sends goods identifying information, for example, goods code, goods name, or goods name including additional description information, associated with the selected goods to a predetermined site, for example, a server of a broadcasting station through the network interface 24. The server receiving goods identifying information discriminates goods based on the received information, searches for a site address at which detailed information for the discriminated goods is accessible, and transmits the found site address to the network interface 24 of the digital television 100.

The controller 21 receives the site address through the network interface 24 resends the address to the Internet through the network interface 24. Then, detailed shopping information for the selected goods is received from a server addressed by the sent site address, and is outputted in a video frame showing contained information through a web browsing function executed by the network interface 24 and signal converting function of the frame composer 20.

The broadcasting station site can also provide brief information such as appearance and price of a goods item when transmitting site information for the discriminated goods. In the case that the brief goods information is further provided, it is displayed onto a screen under the control of the controller 21, and then, if detailed information on the goods item is requested from a viewer, the received site address is sent to the Internet to acquire detailed information for that goods from a related server.

Up to now, the method of including and sending goods information and/or purchase information in broadcast signals or acquiring detailed information about desired goods using such information included in broadcast signals has been described.

Hereinafter, a method of accessing contents included in a program or a title while playing the broadcast program including no goods or purchase information, a storage medium storing such a broadcast program, or a DVD title distributed without such information, is described. In an example thereof, the method may be a method of acquiring background music of a DVD movie title, (i.e., an Original Sound Track (OST)) while playing the DVD movie title.

The method of accessing information according to an example embodiment of the present invention can be applied to the broadcast receiver shown in FIG. 4 or 13 and to a video device. The video device can record an externally input title, such as a broadcast program received through a broadcast reception unit, on a storage medium, such as a hard disk or a recordable optical disk, and play a title recorded in the storage medium or a playable optical disk.

Figure 15:
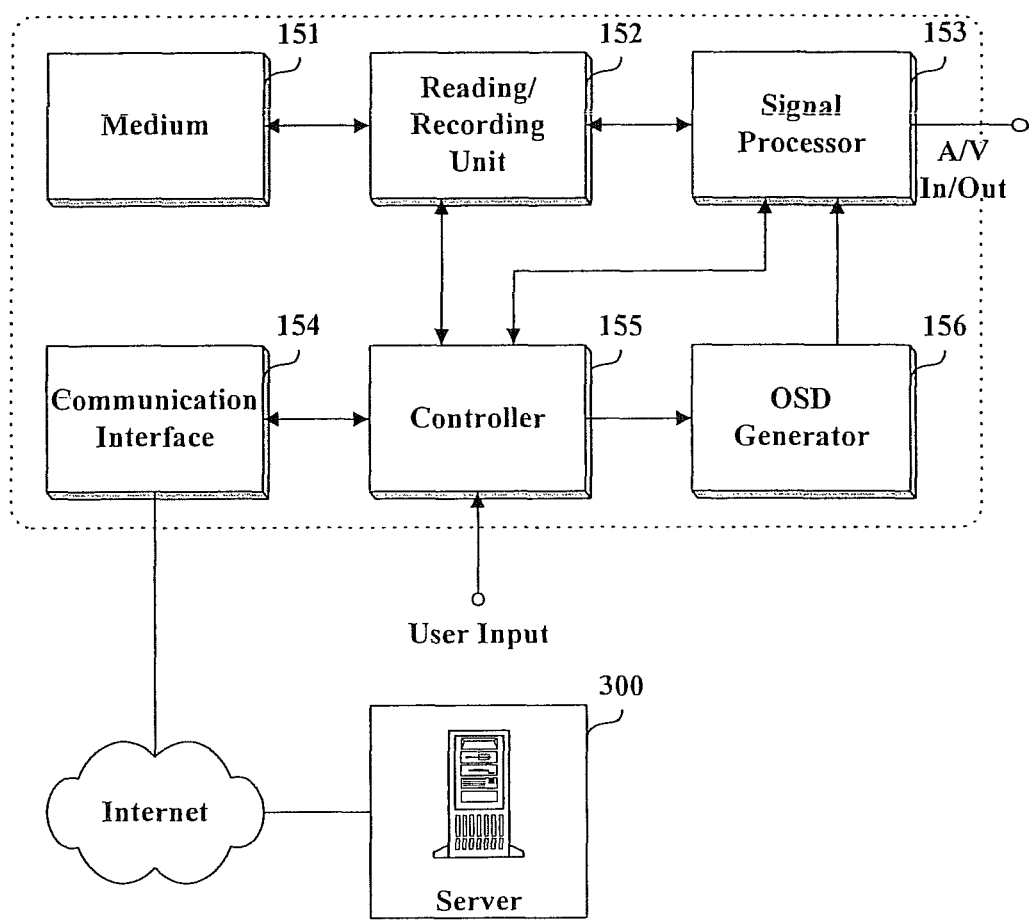
FIG. 15 shows construction of a video device to which the method of accessing information according to an example embodiment of the present invention is applied.

FIG. 15 shows a video device to which the method of accessing information according to the example embodiment of the present invention is applied. Other embodiments and configurations are also within the scope of the present invention. The video device may include a storage medium 151, a reading/recording unit 152, a signal processor 153, a communication interface 154, a controller 155, and an On Screen Display (OSD) generator 156. The video device may further include a broadcast reception unit for receiving broadcast signals.

The storage medium 151 may be a playable optical disk, such as a DVD, a recordable optical disk, a hard disk, or flash memory. The reading/recording unit 152 reads and plays a broadcast program or a title recorded on the storage medium, and records a broadcast program, received from a broadcast reception unit, or externally input video data on the storage medium 151. The signal processor 153 decodes a broadcast program or a title, read from the reading/recording unit 152, into audio and video data and outputs the audio and video data to an external output device such as a TV set.

The communication interface 154 connects to a server 300 via a network, such as the Internet, and receives information or data related to contents (e.g. audio music) included in a currently played title.

The controller 155 controls the operation of the component means in response to a user's key input. For example, when a user requests the playback of a title stored in the storage medium 151, the controller 155 controls the reading/recording unit 152 and the signal processor 153, thereby decoding the data stream of the title and outputting audio and video.

When a user presses a specific key while the title is being played so as to acquire information about specific contents included in the title or the complete data of corresponding contents, for example, when a user presses the specific key (e.g. a complete listening button) while background music is played in a DVD music title so as to view information about the corresponding background music or listen to all of the corresponding background music, the controller 155 controls the communication interface 154, thereby connecting to the server 300, delivering the partial data of the background music, the header information of the data of the background music, or information about the position or time of the playback of the background music to the server 300, and requesting the transmission of information about the background music and the complete data of the background music.

The server 300 searches a database for the requested information about music and/or the requested complete audio data of music, and provides found information and/or data over the Internet, and the controller 155 controls the OSD generator 156, thereby creating a screen containing the information about music, and controls the signal processor 153, thereby playing all of the downloaded audio data.

Meanwhile, in the case where a broadcast reception unit is included in the video device, a user can access contents (e.g. music) included in a program being played while playing a broadcast program received through the broadcast reception unit, via the above-described process. As a result, the user can acquire information about contents, part of which is included in a title being played, or complete data of the corresponding contents. An example that is performed when a title stored in a storage medium is played is described in detail below.

Figure 16:
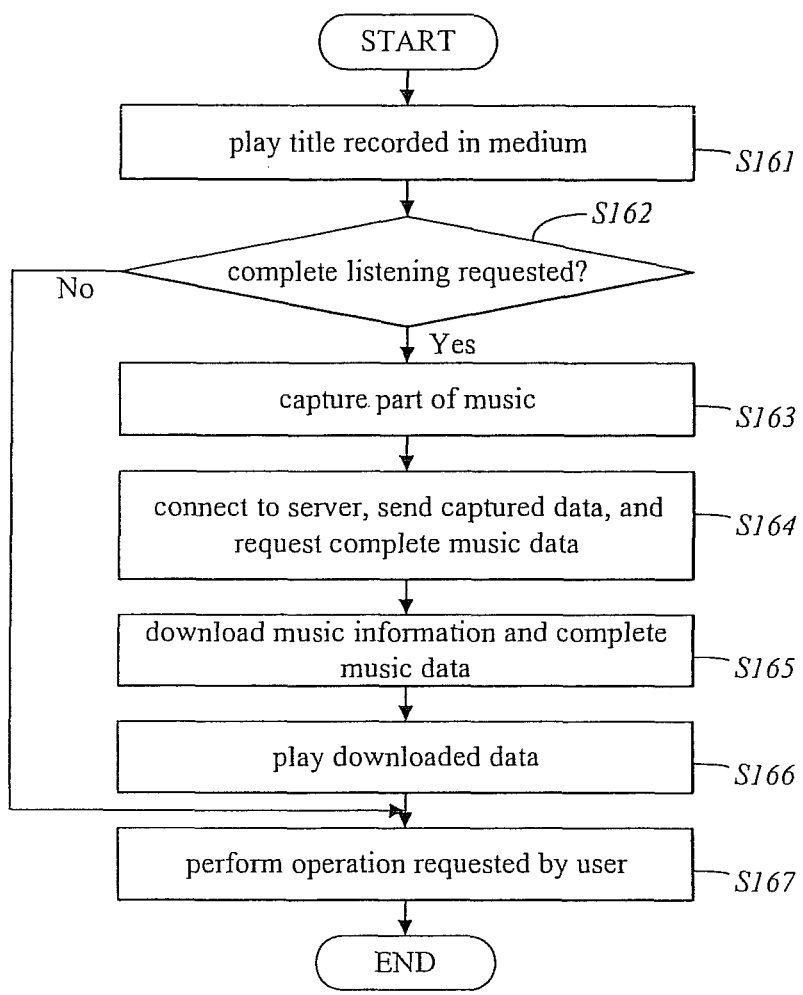
FIG. 16 is a flowchart showing a method of accessing information according to an example embodiment of the present invention.

FIG. 16 is a flowchart showing a method of accessing information according to an example embodiment of the present invention. Other embodiments and configurations are also within the scope of the present invention.

The controller 151 controls the reading/recording unit 152 and the signal processor 153 at the request of a user, thereby performing operations of reading the data stream of a title from the storage medium 10 and playing the data stream at step S161.

For example, when a user requests complete listening to background music while the background music is played during the playback of a DVD movie title at step S162, the controller 151 controls the signal processor 153, thereby capturing partial data of the background music corresponding to a predetermined time period, for example, 5 seconds, on the basis of the time point of the request at step S163. For example, only a payload corresponding to the data of the music for a predetermined time period can be captured.

Thereafter, the controller 151 controls the communication interface 154, thereby connecting to the server 300, transmitting the captured partial data of the music, and requesting information about the corresponding music and/or complete data of the music at step S164. In this case, link information for connection to the server, for example, Uniform Resource Locator (URL) information, may be included in the management information of the storage medium 151, for example, navigation information, or may be separately managed in nonvolatile memory, such as Electrically Erasable Programmable Read-Only Memory (EEPROM), provided in the equipment.

Figures 17, 18:
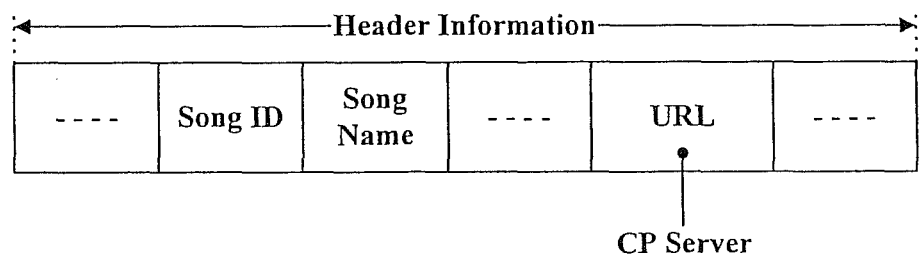
FIG. 17 shows a database of a server according to an example embodiment of the present invention.
FIG. 18 shows header information of audio data according to an example embodiment of the present invention.

For example, as shown in FIG. 17, N song entries #1~#n may be managed in the database (CP Server_Database) of the server 300, and various pieces of song information, such as a song ID, a song name, a singer name, lyrics, and the audio data of a song are stored for each of the song entries.

The server 300 receives the partial data of music sent through the communication interface 154 of the video device, searches for a song entry including audio data matching the partial data of music, and sends song information, such as a song name, a singer name, and lyrics, and/or all of the audio data stored in the found song entry, to the communication interface 154 of the video device.

The controller 151 downloads the song information and all of the audio data from the server 300 at step S165, and controls the signal processor 153, thereby playing the downloaded audio data at step S166. In the case where a user requests the display of the song information, the controller 151 controls the OSD generator 156, thereby creating and displaying a screen containing the various pieces of song information, such as the name of the corresponding song, the singer name, and the lyrics of the song. The downloaded complete audio data may be stored on the storage medium 151 or other media depending on the rights granted therefor.

When the complete data of music sent from the server 300 has been played, the controller 155 performs the operation requested by the user at step S167. Alternatively, the controller 155 may temporarily stop the playback of the tide during a complete listening operation, and resume the operation of playing the title after the complete listening operation has been completed.

In another example embodiment, when a user requests complete listening to music played in a title, the controller 151 controls the signal processor 153, thereby checking the header information of the audio data being played at that moment. As shown in FIG. 18, the header information may include a song ID, a song name, and URL information for connection to the server.

The controller 151 controls the communication interface 154, thereby connecting to the server 300 corresponding to the URL information, sending the song ID and the song name, included in the header information, to the server 300, and requesting information about the corresponding song and/or complete data of the song.

The server 300 searches a database, constructed as described with reference to FIG. 17 above, for a song entry including the song ID and the song name sent via the communication interface 154 of the video device, and sends song information, such as a song name, a singer name, lyrics, and/or complete audio data, stored in the found song entry, to the communication interface 154 of the video device. Then, the controller 151 plays the audio data while downloading the song information and the complete audio data from the server 300.

For reference, the header information of the audio data may vary depending on the format of the storage medium or the format of the source title (e.g. the format of a broadcast program in the case where a broadcast is recorded).

In still another example embodiment, when a user requests complete listening to a song played in a title currently being played, the controller 151 checks position information indicating the position at which the audio data being played at that moment was recorded or time information indicating the time from which the playback of the audio data started, along with ID information indicating the ID of a corresponding storage medium, for example, a disk ID. The position information may be a radial position or physical address at which corresponding audio data is located.

Thereafter, the controller 151 controls the communication interface 154, thereby connecting to the server 300, sending the found disk ID and position information or time information, and requesting information about the corresponding song and/or the complete data of the song.

For example, as shown in FIG. 19, N song entries #1~#m may be managed in the database of the server 300, and song information, such as a song ID, a song name, a disc ID, position information (position value) and time information (time value), and audio data are stored in each of the song entries.

The server 300 receives the disk ID and the position information or the time information sent through the communication interface 154 of the video device, searches for a song entry including matching information, and sends song information, such as a song name, a singer name and lyrics, and/or complete audio data stored in the found song entry, to the communication interface 154 of the video device. Then, the controller 151 plays the audio data while downloading the song information and the complete audio data sent from the server 300.

In the embodiment in which the partial data of a song or the header information of requested audio data is sent while complete listening to the song is requested, the ID of a corresponding disk may be additionally sent in the case where a title currently being played is a storage medium title, such as a playable disk title, and the ID of a corresponding program may be additionally sent in the case where a title currently being played is a broadcast program title, thereby allowing the server to easily conduct a search.

In this case, in the database of the server, a disk ID or a program ID is additionally recorded in conjunction with the above data in each song entry. Alternatively, in the database of the server, songs may be classified and managed according to the disk ID or program ID, that is, information about all of the songs pertaining to a corresponding disk ID or program ID may be managed together, as illustrated in FIG. 17 or FIG. 19.

Although, in the above embodiment, the example of performing complete listening while playing a title stored in a storage medium has been described, the above embodiment can be somewhat modified and then applied to the case where users wish to access the complete data of contents, such as music, frame-shaped video clips, or frame-shaped pictures, included in broadcast programs received via broadcast reception units and then played.

For example, like the case where a predetermined part of audio data (i.e., a payload corresponding to a predetermined time period) is sent to a server for audio searching, a predetermined part of video data (i.e., a payload corresponding to a partial region or a partial time interval of the partial region) may be sent to a server for video or image searching.

A contents provider, manufacturing CDs, DVDs, BDs or the like, or a broadcasting station providing broadcast programs provides a database, as shown in FIGS. 17 and 19, and enhances a search function of searching the database based on information sent from a user so that the contents provider or broadcasting station can satisfy users' desire to access intangible contents included in titles or broadcast programs without directly including goods information, purchase information or the like in the titles or broadcast programs.

As a result, information about contents included in a title or a program being played and the complete data of the corresponding contents can be acquired over the Internet.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of processing both service information and audio/video (A/V) data in an internet protocol television (IPTV), the method comprising:
    receiving both service information and A/V data from a digital broadcasting network, wherein the service information includes a uniform resource locator (URL) information, and the A/V data corresponds to a specific broadcast program;
    processing both the service information and the A/V data;
    displaying a specific product information informing a user that an additional information is available while outputting the processed A/V data, wherein the URL information is used to retrieve the additional information and the specific product information is coupled to each of the items included in the specific broadcast program;
    connecting to a specific URL via an internet network in response to selecting the specific product information; and
    displaying the additional information by accessing the specific URL,
    wherein the specific product information is displayed at a specific position, further the specific position changes depending on the video data corresponding to the specific broadcast program.

2. The method of claim 1, wherein information on the specific position is received from the digital broadcasting network, and the information on the specific position is stored in a memory of the IPTV.

3. The method of claim 1, wherein the specific product information is displayed in response to selecting a specific key button of a remote controller.

4. The method of claim 1, wherein the specific product information corresponds to an icon representing the specific product or a name of the specific product.

5. The method of claim 1, wherein the additional information comprises second URL information.

6. The method of claim 5, further comprising:
    connecting to second URL via the internet network, the second URL is used to purchase the specific product.

7. A television connectable to an internet network, the television comprising:
    a receiver configured to receive service information and A/V data, wherein the service information includes a uniform resource locator (URL) information, and the A/V data corresponds to a specific broadcast program;
    an audio processor configured to process the audio data corresponding to the specific broadcast program;
    a video processor configured to process the video data corresponding to the specific broadcast program; and
    a controller configured to display a specific product information informing a user that an additional information is available while outputting the processed A/V data, wherein the URL information is used to retrieve the additional information and the specific product information is coupled to each of the items included in the specific broadcast program,
    wherein the specific product information is displayed at a specific position, further the specific position changes depending on the video data corresponding the specific broadcast program.

8. The television of claim 7, further comprising:
    an internet interface configured to connect to a specific URL via the internet network in response to selecting the specific product information, wherein the controller is configured to display the additional information retrieved from the specific URL.

9. The television of claim 8, wherein information on the specific position is received from a digital broadcasting network, and the information on the specific position is stored in a memory of the television.

10. The television of claim 8, wherein the specific product information is displayed in response to selecting a specific key button of a remote controller.

11. The television of claim 8, wherein the specific product information corresponds to an icon representing the specific product or a name of the specific product.

12. The television of claim 8, wherein the additional information comprises second URL information.

13. The television of claim 12, wherein the internet interface is configured to connect to second URL via the internet network, the second URL is used to purchase the specific product.

* * * * *

UNITED STATES PATENT AND TRADEMARK OFFICE
CERTIFICATE OF CORRECTION

| | |
|---|---|
| PATENT NO. | : 9,749,697 B2 |
| APPLICATION NO. | : 14/705369 |
| DATED | : August 29, 2017 |
| INVENTOR(S) | : Bok Hyun Pack et al. |

It is certified that error appears in the above-identified patent and that said Letters Patent is hereby corrected as shown below:

On the Title Page

Related U.S. Application Data should read:
(63) Continuation of application No. 13/494,345, filed on Jun. 12, 2012, now Pat. No. 9,083,854, which is a continuation of application No. 11/819,919, filed on Jun. 29, 2007, now Pat. No. 8,205,223, which is a continuation-in-part of application No. 11/415,172, filed on May 2, 2006, now Pat. No. 7,827,577, which is a continuation of application No. 09/832,871, filed on Apr. 12, 2001, now abandoned.

Signed and Sealed this
Thirteenth Day of February, 2018

Andrei Iancu
*Director of the United States Patent and Trademark Office*